United States Patent
Kunihiro et al.

(10) Patent No.: US 11,975,719 B2
(45) Date of Patent: May 7, 2024

(54) TRAVELING CONTROL APPARATUS

(71) Applicants: TOYOTA JIDOSHA KABUSHIKI KAISHA, Toyota (JP); DENSO CORPORATION, Kariya (JP)

(72) Inventors: Yoji Kunihiro, Susono (JP); Takahiro Kojo, Gotemba (JP); Hisaya Akatsuka, Kariya (JP); Hirotaka Tokoro, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 174 days.

(21) Appl. No.: 17/656,348

(22) Filed: Mar. 24, 2022

(65) Prior Publication Data

US 2022/0306114 A1    Sep. 29, 2022

(30) Foreign Application Priority Data

Mar. 26, 2021    (JP) .................................. 2021-053291

(51) Int. Cl.
| | |
|---|---|
| *B60W 30/18* | (2012.01) |
| *B60W 10/20* | (2006.01) |
| *B60W 30/12* | (2020.01) |
| *B60W 50/08* | (2020.01) |
| *G06V 20/56* | (2022.01) |

(52) U.S. Cl.
CPC ...... *B60W 30/18163* (2013.01); *B60W 10/20* (2013.01); *B60W 30/12* (2013.01); *B60W 50/087* (2013.01); *G06V 20/588* (2022.01); *B60W 2420/403* (2013.01); *B60W 2510/202* (2013.01); *B60W 2540/18* (2013.01); *B60W 2552/53* (2020.02); *B60W 2710/207* (2013.01)

(58) Field of Classification Search
CPC ...................... G06V 20/588; B60W 30/18163
See application file for complete search history.

(56) References Cited

U.S. PATENT DOCUMENTS

| | | | |
|---|---|---|---|
| 2007/0233386 A1* | 10/2007 | Saito ...................... | G08G 1/165 |
| | | | 701/117 |
| 2017/0240177 A1 | 8/2017 | Fujii et al. | |
| 2018/0178802 A1* | 6/2018 | Miyata ................ | B60W 30/095 |
| 2018/0345959 A1* | 12/2018 | Fujii ............... | B60W 30/18163 |

(Continued)

FOREIGN PATENT DOCUMENTS

JP    2017-149179 A    8/2017

*Primary Examiner* — Long T Tran
(74) *Attorney, Agent, or Firm* — Dickinson Wright, PLLC (57) ABSTRACT

A traveling control apparatus that allows lane changing due to a driver's steering intervention while continuing lane maintenance control includes an electronic control unit. The electronic control unit sets a target trace along a lane in which a vehicle is traveling, determines a target steering angle of the vehicle based on the target trace and a lateral position of the vehicle, applies control torque to a steering shaft of the vehicle based on the target steering angle, resets, in response to a change in the lateral position due to the driver's steering intervention which exceeds the control torque and entrance of the vehicle into an adjacent lane, the target trace to the adjacent lane, and determines, using a gradual changing function, in response to the resetting of the target trace, the target steering angle by changing the target steering angle at the time of the resetting.

5 Claims, 5 Drawing Sheets

(56) References Cited

U.S. PATENT DOCUMENTS

| | | | |
|---|---|---|---|
| 2020/0039584 A1* | 2/2020 | Igarashi | B62D 6/00 |
| 2020/0255007 A1* | 8/2020 | Tsuji | B60W 50/16 |
| 2020/0406969 A1* | 12/2020 | Ersal | B60W 10/184 |
| 2022/0289228 A1* | 9/2022 | Yamamoto | B60K 35/28 |

* cited by examiner

FIG. 4H $\theta_{tgt} = \theta_{tgt1} + (\theta_{hold} - \theta_{tgt1}) \times e^{-at}$

TRAVELING CONTROL APPARATUS

CROSS-REFERENCE TO RELATED APPLICATION

This application claims priority to Japanese Patent Application No. 2021-053291 filed on Mar. 26, 2021, incorporated herein by reference in its entirety.

BACKGROUND

1. Technical Field

The present disclosure relates to a traveling control apparatus.

2. Description of Related Art

Japanese Unexamined Patent Application Publication No. 2017-149179 (JP 2017-149179 A) discloses an apparatus that executes lane maintenance control and automatic lane changing control. This apparatus interrupts the lane maintenance control when the automatic lane changing control is executed during the execution of the lane maintenance control.

SUMMARY

In the apparatus described in JP 2017-149179 A, the lane maintenance control is interrupted every time the lane is changed. For this reason, the number of operations for resuming the lane maintenance control may be increased. To restrict such an increase in the number of operations, it is conceivable to execute the lane changing by a driver's manual intervention while continuing the lane maintenance control function, that is, to implement semi-automatic driving by the cooperation of the driver and a lane maintenance control system in the lane changing. However, when the lane changing is executed while continuing the lane maintenance control, a change in a target steering angle of the lane maintenance control system becomes large at a timing at which a lane that a vehicle is following is switched, and thus the driver may feel a sense of discomfort. The present disclosure provides a technology that can restrict a change in a target steering angle when the lane changing is executed by a driver's manual intervention while continuing lane maintenance control.

A traveling control apparatus according to an aspect of the present disclosure allows lane changing due to a driver's steering intervention while continuing lane maintenance control that controls traveling of a vehicle such that the vehicle travels in a lane. The traveling control apparatus includes an electronic control unit. The electronic control unit is configured to set a target trace along a lane in which the vehicle is traveling, acquire a lateral position of the vehicle, determine a target steering angle of the vehicle based on the set target trace and the acquired lateral position of the vehicle, apply control torque to a steering shaft of the vehicle based on the target steering angle determined by the electronic control unit, reset, in response to a change in the lateral position of the vehicle due to the driver's steering intervention which exceeds the control torque and entrance of the vehicle into an adjacent lane, the target trace to the adjacent lane, and, determine, using a gradual changing function, in response to the resetting of the target trace to the adjacent lane, the target steering angle after the vehicle enters the adjacent lane by changing the target steering angle at a time of resetting the target trace. The adjacent lane is adjacent to the lane.

In this apparatus, in response to the change in the lateral position of the vehicle due to the driver's steering intervention which exceeds the control torque and the entrance of the vehicle into the adjacent lane, the target trace is reset to the adjacent lane. The adjacent lane is adjacent to the lane. Then, in response to the resetting of the target trace to the adjacent lane, the target steering angle after the vehicle enters the adjacent lane is determined, using a gradual changing function, by changing the target steering angle at the time of resetting the target trace. As such, when the target trace is switched, this apparatus does not determine the target steering angle based on the target trace and the lateral position of the vehicle, but can determine the target steering angle in the adjacent lane such that the target steering angle is gradually changed from the target steering angle at the time of resetting the target trace. Therefore, when the lane changing is executed by the driver's manual intervention while continuing the lane maintenance control, this apparatus can restrict the change in the target steering angle as compared with a change when the target steering angle is determined based on the target trace and the lateral position of the vehicle.

In the above aspect, in the gradual changing function, a gradual changing amount per unit time may be higher than a predetermined value during a period from a timing at which the vehicle enters the adjacent lane to a lapse of a predetermined time, and lower than the predetermined value after a lapse of the period.

In the above aspect, the electronic control unit may apply a processing filter to the target steering angle when the target trace is set to the lane and the adjacent lane. The electronic control unit does not have to apply the processing filter to the target steering angle when the target trace is reset to the adjacent lane.

In the above aspect, the electronic control unit may execute, in response to returning to the lane during the gradual changing after the vehicle enters the adjacent lane, the processing from the target steering angle during the gradual changing that resets the target trace to the lane.

In the above aspect, the electronic control unit may determine, when the driver ends the steering intervention before the vehicle enters the adjacent lane, the target steering angle such that the target steering angle at an end of the driver's steering approaches a target angle for following the lane before the gradual changing with a lapse of time from the end of the driver's steering. The apparatus configured in this manner can prevent the target steering angle from being suddenly changed when the driver takes his/her hand off a steering wheel before the vehicle enters the adjacent lane. Then, when the vehicle enters the adjacent lane while the target steering angle is being smoothly converged after the hand is taken off the steering wheel, the target steering angle in the adjacent lane is determined such that the target steering angle is gradually changed from the target steering angle at the time of resetting the target trace. Therefore, this apparatus can restrict the change in the target steering angle even when the driver takes his/her hand off the steering wheel before the vehicle enters the adjacent lane.

In the above aspect, the electronic control unit may generate a lane changing track from the lane to the adjacent lane, control the traveling of the vehicle such that the vehicle travels along the generated lane changing track, and reset, in response to the change in the lateral position of the vehicle due to the driver's steering intervention during the lane changing and the entrance of the vehicle into the adjacent lane, the target trace to the adjacent lane. The adjacent lane is adjacent to the lane. With this configuration, when the vehicle enters the adjacent lane due to the driver's steering intervention during the lane changing by an automatic lane changing function, the target steering angle in the adjacent lane is determined such that the target steering angle is gradually changed from the target steering angle at the time of resetting the target trace. Therefore, this apparatus can restrict the change in the target steering angle even when the vehicle enters the adjacent lane due to the driver's steering intervention during the lane changing by the automatic lane changing function.

With the foregoing aspect of the present disclosure, it is possible to restrict a change in a target steering angle when lane changing is executed by a driver's manual intervention while continuing lane maintenance control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an exemplary embodiment will be described with reference to drawings. In the description below, same or corresponding elements are designated by same reference signs, and thus duplicate description thereof will not be repeated.

Configurations of Vehicle and Traveling Control Apparatus

Figure 1:
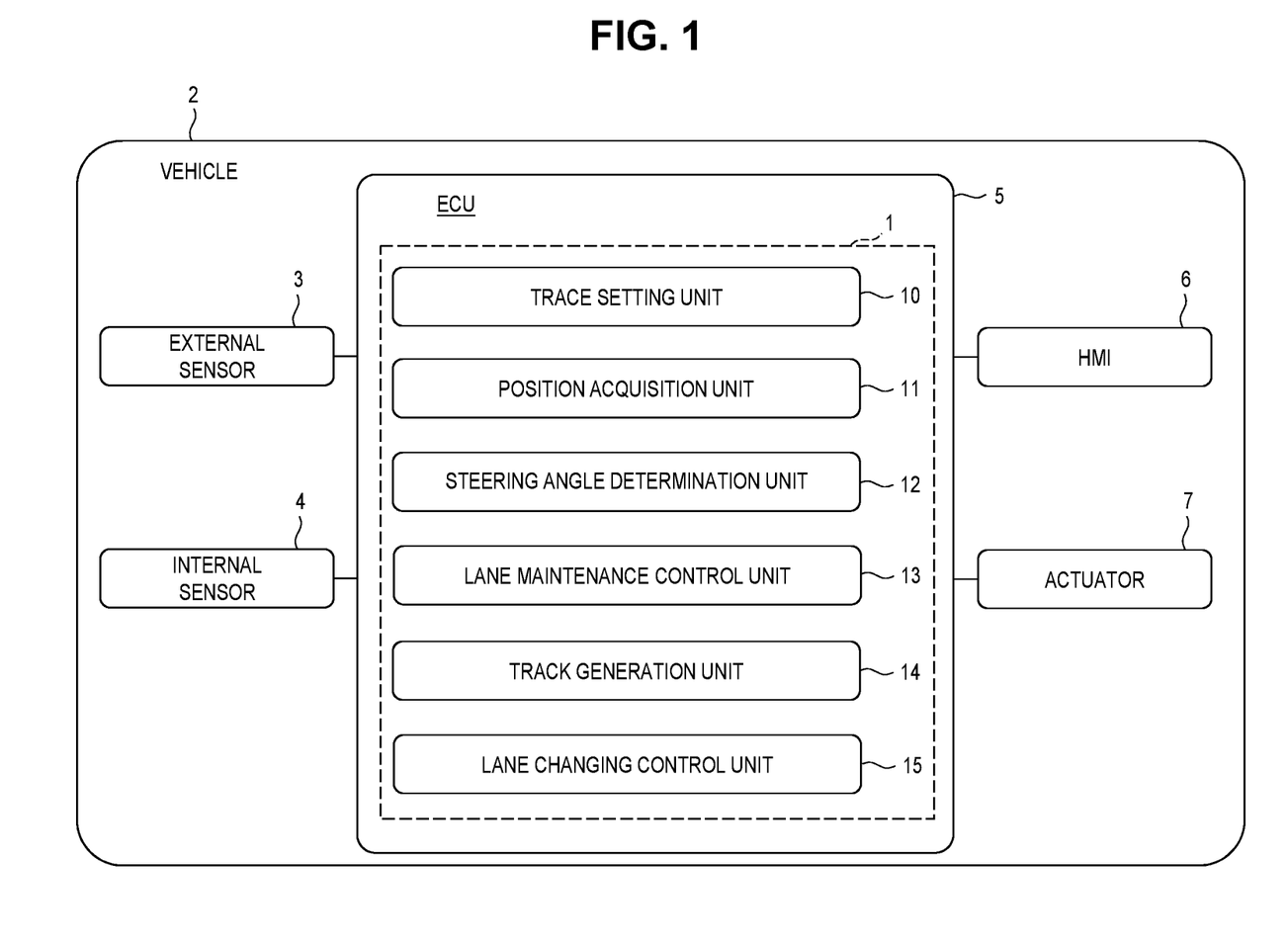
FIG. 1 is a functional block diagram of an example of a vehicle including a traveling control apparatus according to an embodiment.

FIG. 1 is a functional block diagram of an example of a vehicle including a traveling control apparatus 1 according to an embodiment. As illustrated in FIG. 1, the traveling control apparatus 1 is mounted on a vehicle 2, such as a bus, a taxi, or a general passenger car. The traveling control apparatus 1 controls traveling of the vehicle 2 such that the vehicle 2 travels in a lane. Specifically, the traveling control apparatus 1 controls traveling of the vehicle 2 such that the vehicle 2 travels in a lane by applying control torque to a steering shaft of the vehicle 2. Then, the traveling control apparatus 1 allows lane changing due to a driver's steering intervention while continuing lane maintenance control. For example, in a state where the control torque is applied, the driver can execute a driving operation with input torque greater than the control torque and cause the vehicle to move to an adjacent lane, which is adjacent to the lane in which the vehicle 2 travels. In other words, the traveling control apparatus 1 can cause the vehicle 2 to travel in cooperation with the driver under the lane maintenance control.

The vehicle 2 includes an external sensor 3, an internal sensor 4, an electronic control unit (ECU) 5, a human machine interface (HMI) 6, and an actuator 7.

The external sensor 3 is a detector that detects information on the external environment of the vehicle 2. Examples of the external environment include a position of an object around the vehicle 2 and a condition of the object. A detection result of the external sensor 3 includes a position, a shape, a color, and the like of an object in front of a vehicle road on which the vehicle 2 travels. Examples of the object include a vehicle, a pedestrian, traffic lights, and road surface paint. Examples of the external sensor 3 include a camera.

The camera is an image capturing device that captures an image of an external situation of the vehicle 2. The camera is provided on, for example, a backside of a front windshield of the vehicle 2. The camera acquires captured image information on the external situation of the vehicle 2. The camera may be a monocular camera or a stereo camera. A stereo camera has two image capturing units arranged to reproduce binocular parallax. The captured image information of the stereo camera also includes information in the depth direction.

The external sensor 3 is not limited to the camera, and may be a radar sensor and the like. The radar sensor is a detector that detects an object around the vehicle 2 using radio waves (for example, millimeter waves) or light. Examples of the radar sensor include millimeter-wave radar or Laser Imaging Detection and Ranging (LIDAR). The radar sensor detects an object by transmitting radio waves or light to the periphery of the vehicle 2 and receiving the radio waves or light reflected by the object.

The internal sensor 4 is a detector that detects a traveling state of the vehicle 2. The internal sensor 4 includes a steering angle sensor. The steering angle sensor is a detector that detects a rotation amount of the steering shaft of the vehicle 2. The internal sensor 4 may include a vehicle speed sensor, an acceleration sensor, and a yaw rate sensor. The vehicle speed sensor is a detector that detects speed of the vehicle 2. As the vehicle speed sensor, for example, a wheel speed sensor, which is provided on a wheel, a drive shaft that rotates integrally with the wheel, or the like, of the vehicle 2 and which detects rotation speed of the wheel, is used. The acceleration sensor is a detector that detects acceleration of the vehicle 2. The acceleration sensor may include a front-rear acceleration sensor that detects acceleration of the vehicle 2 in the front-rear direction and a lateral acceleration sensor that detects acceleration of the vehicle 2 in the right-to-left direction. The yaw rate sensor is a detector that detects a yaw rate (rotational angular speed) around the vertical axis of the center of gravity of the vehicle 2. As the yaw rate sensor, for example, a gyro sensor can be used.

The ECU 5 controls the traveling of the vehicle 2. The ECU 5 is an electronic control unit having a central processing unit (CPU), a read-only memory (RAM), a random access memory (ROM), a controller area network (CAN) communication circuit, and the like. The ECU 5 is connected to a network that communicates using, for example, a CAN communication circuit, and is communicably connected to the above-described elements of the vehicle 2. For example, the ECU 5 implements functions described below by operating a CAN communication circuit to input/output data based on a signal output by the CPU, storing the data in the RAM, loading a program stored in the ROM into the RAM, and executing the program loaded into the RAM. The ECU 5 may be composed of a plurality of ECUs.

The HMI 6 is an interface between occupants (including the driver) of the vehicle 2 and a system implemented by the ECU 5. Examples of the HMI 6 include a touch display capable of displaying information and accepting an operation input of an occupant.

The actuator 7 is a device that executes traveling control of the vehicle 2. The actuator 7 includes at least an engine actuator, a brake actuator, and a steering actuator. The engine actuator controls a drive force of the vehicle 2 by changing an amount of air supplied to an engine (for example, changing a throttle opening degree) in response to a driving operation or a control signal of the ECU 5. When the vehicle 2 is a hybrid vehicle or an electric vehicle, the engine actuator controls the drive force of a motor as a power source.

The brake actuator controls a braking system in response to the control signal from the ECU 5 and controls the braking force applied to the wheel of the vehicle 2. As the braking system, for example, a hydraulic braking system can be used. When the vehicle 2 is provided with a regenerative braking system, the brake actuator may control both the hydraulic braking system and the regenerative braking system. The steering actuator controls the drive of an assistant motor that controls steering torque in an electric power steering system in response to the control signal from the ECU 5. As such, the steering actuator controls the steering torque of the vehicle 2.

Each Configuration of ECU

Figure 2A:
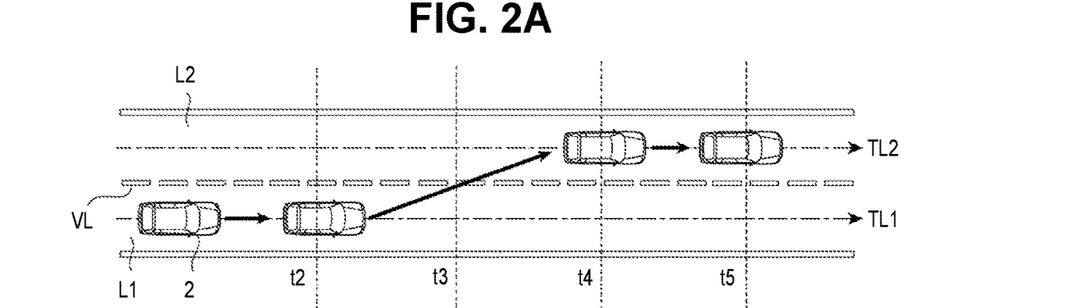
FIG. 2A is a diagram illustrating an example of a scene of lane changing.

As functional components, the traveling control apparatus 1 includes a trace setting unit 10, a position acquisition unit 11, a steering angle determination unit 12, a lane maintenance control unit 13, a track generation unit 14, and a lane changing control unit 15. When the vehicle 2 does not have an automatic lane changing function, the traveling control apparatus 1 does not have to include the lane changing control unit 15. Functions of the traveling control apparatus 1 will be described with reference to FIGS. 2A to 2H. FIG. 2A is a diagram illustrating an example of a scene of lane changing.

In FIG. 2A, the vehicle 2 is traveling on a road having two lanes on each side. As illustrated in FIG. 2A, the vehicle 2 is traveling in a first lane L1 while exerting a lane maintenance function. At time t1, the driver of the vehicle 2 turns on a turn signal indicator to change lanes to a second lane L2, which is adjacent to the first lane L1. Then, the driver operates the steering wheel from time t2 to change a lateral position of the vehicle 2 so as to approach the second lane L2 by input torque exceeding the control torque. Then, at time t3, the vehicle 2 crosses a boundary line VL between the first lane L1 and the second lane L2, and enters the second lane L2. Thereafter, at time t4, the driver takes his/her hand off the steering wheel and then turns off the turn signal indicator. At this time, the vehicle 2 is positioned at the center of the second lane L2 and travels in the second lane L2 while exerting the lane maintenance function.

Figure 2B:
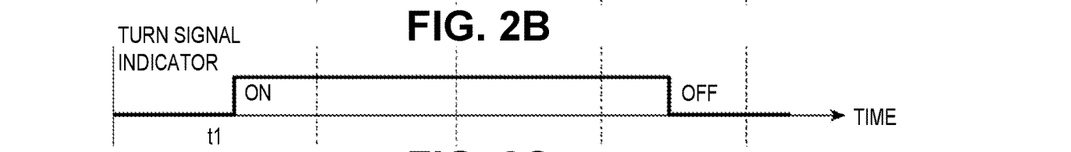
FIG. 2B is a time chart of a state of a turn signal indicator.
Figure 2C:
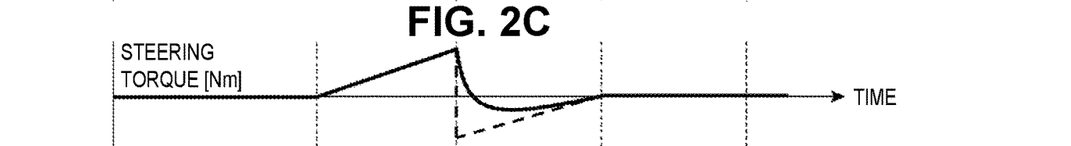
FIG. 2C is a time chart of steering torque.

FIGS. 2B and 2C are time charts associated with the above-described operations of the driver. FIG. 2B is a time chart of a state of the turn signal indicator and FIG. 2C is a time chart of the steering torque. The steering torque is detected by, for example, a torque sensor provided on the steering shaft of the vehicle 2. A left turn of the steering wheel has a positive value and a right turn of the steering wheel has a negative value. As illustrated in FIGS. 2B and 2C, the turn signal indicator is turned on at time t1, which is before time t2 when the driver grasps the steering wheel and starts steering, and turned off after time t4 when the driver takes his/her hand off the steering wheel. As illustrated in FIG. 2C, the steering torque is detected while the driver applies force to the steering wheel.

The trace setting unit 10 sets a target trace along a lane in which the vehicle 2 is traveling. The target trace is a trace targeted by the lane maintenance control unit 13, and is provided such that the vehicle 2 passes through, for example, a central position of the lane in which it is traveling. The trace setting unit 10 acquires a position of a lane boundary line detected by the external sensor 3 and sets the target trace. For example, when the vehicle 2 is traveling in the first lane L1, the trace setting unit 10 sets a first trace TL1 to the central position of the first lane L1.

The position acquisition unit 11 acquires the lateral position of the vehicle 2. The position acquisition unit 11 acquires the position of the lane boundary line detected by the external sensor 3 and acquires a position in the lateral direction in the lane in which the vehicle 2 is traveling.

The steering angle determination unit 12 determines a target steering angle $\theta_{tgt}$ of the vehicle 2 based on the target trace set by the trace setting unit 10 and the lateral position of the vehicle 2 acquired by the position acquisition unit 11. The target steering angle $\theta_{tgt}$ is a control parameter for driving the assistant motor by the lane maintenance control unit 13. For example, when there is a deviation between the first trace TL1 set by the trace setting unit 10 and the lateral position of the vehicle 2, the steering angle determination unit 12 sets a steering angle for canceling the deviation as the target steering angle $\theta_{tgt}$.

The lane maintenance control unit 13 applies the control torque to the steering shaft of the vehicle 2 based on the target steering angle $\theta_{tgt}$ determined by the steering angle determination unit 12. The magnitude of the control torque may be set to increase according to the target steering angle $\theta_{tgt}$, or may be a constant value. Since the vehicle 2 traveling, for example, in the first lane L1 travels along the first trace TL1 by setting the target steering angle so as to cancel the deviation between the target trace and the lateral position of the vehicle 2 and applying the control torque such that the steering angle becomes the target steering angle, the vehicle 2 automatically travels in the first lane L1. As such, the lane maintenance function is implemented by the cooperation between the trace setting unit 10, the position acquisition unit 11, the steering angle determination unit 12, and the lane maintenance control unit 13.

Figure 2D:
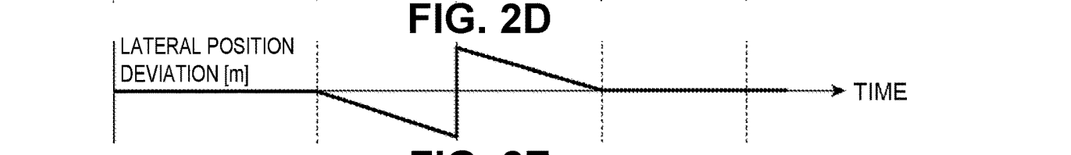
FIG. 2D is a time chart of a lateral position deviation.
Figure 2E:
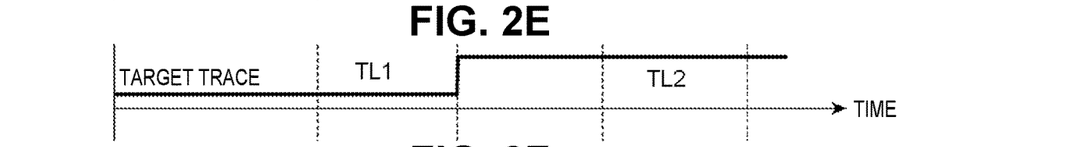
FIG. 2E is a time chart for setting a target trace.
Figure 2F:
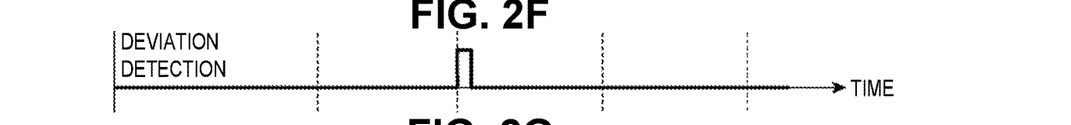
FIG. 2F is a time chart in which discontinuity of a deviation between the target trace and a lateral position of a vehicle is detected.
Figure 2G:
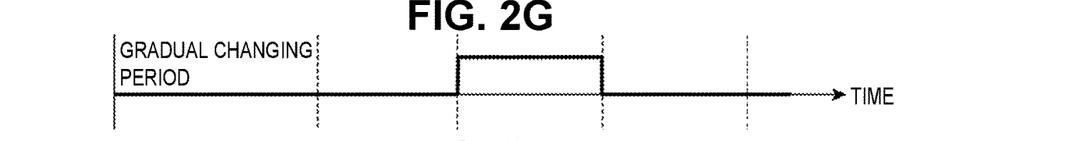
FIG. 2G is a time chart illustrating a gradual changing period of a target steering angle.
Figure 2H:
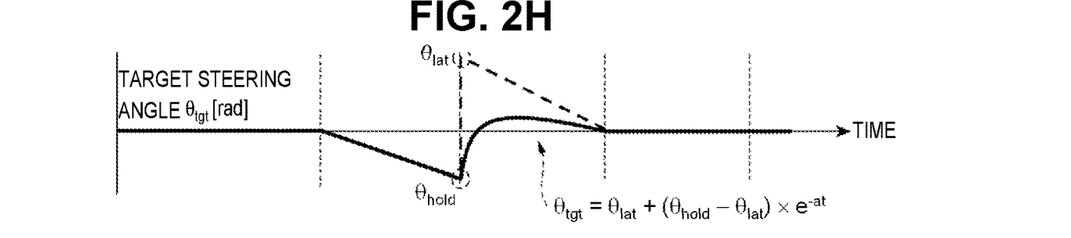
FIG. 2H is a time chart of the target steering angle.

FIGS. 2D to 2H are time charts associated with operations of the above-described trace setting unit 10, position acquisition unit 11, steering angle determination unit 12, and lane maintenance control unit 13. FIG. 2D is a time chart of a lateral position deviation, FIG. 2E is a time chart for setting a target trace, FIG. 2F is a time chart in which discontinuity of a deviation between the target trace and a lateral position of a vehicle is detected, FIG. 2G is a time chart illustrating a gradual changing period of a target steering angle, and FIG. 2H is a time chart of the target steering angle.

FIG. 2D is a time chart of a deviation between the target trace and the lateral position of the vehicle 2. When viewed from the vehicle 2, a deviation to the left direction (the upward direction in the drawing) of the target trace is negative and a deviation to the right direction (the lower direction in the drawing) is positive. When the driver starts steering at time t2, the vehicle 2 moves away from the first trace TL1 which is the target trace and approaches the second lane L2. For this reason, as illustrated in FIG. 2D, the absolute value of the deviation between the first trace TL1 and the lateral position of the vehicle 2 is gradually increased since time t2 (the deviation between the first trace TL1 and the lateral position of the vehicle 2 is increased in the negative direction).

FIG. 2H is a time chart of the target steering angle determined by the steering angle determination unit 12. In the target steering angle $\theta_{tgt}$, a left turn of the steering wheel has a positive value and a right turn of the steering wheel has a negative value. The deviation between the first trace TL1 and the lateral position of the vehicle 2 is gradually increased since time t2 in the negative direction, and accordingly, as illustrated in FIG. 2H, the target steering angle $\theta_{tgt}$ is set to a steering angle in the negative direction which is the direction opposite to the driver's steering from time t2. As such, the lane maintenance control unit 13 applies the control torque to the steering shaft such that the steering angle of the vehicle 2 becomes a target steering angle $\theta_{tgt}$. In other words, by applying the control torque in the direction opposite to the driver's steering wheel operation to the steering wheel and adding an input exceeding the control torque to the steering wheel, the vehicle 2 moves so as to gradually approach the second lane L2. As such, the driver operates the vehicle 2 while feeling a load on the steering wheel, and, as illustrated in FIG. 2C, the steering torque is detected in the left-turn direction (the positive direction) from time t2. The size of the target steering angle from time t2 to time t3 is obtained by multiplying a predetermined coefficient (for example, 0.1 to 0.9) by the target steering angle obtained from the deviation between the first trace TL1 and the lateral position of the vehicle 2. As such, it is possible to set the target steering angle conservatively with respect to the driver's steering and to smoothly change, when the driver takes his/her hand off the steering wheel, the target steering angle so as to approach the target steering angle at the timing at which the driver takes his/her hand off the steering wheel. Therefore, the behavior of the vehicle 2 becomes stable.

By the driver's operation, at time t3, the vehicle 2 enters the second lane L2 from the first lane L1. At this time, since the lane in which the vehicle 2 is traveling is changed, the trace setting unit 10 resets, as the target trace, the second trace TL2 to the central position of the second lane L2. As illustrated in FIG. 2E, the target trace is reset from the first trace TL1 to the second trace TL2 at the timing at which the vehicle 2 moves from the first lane L1 to the second lane L2 (time t3). The trace setting unit 10 recognizes the timing at which the vehicle 2 moves from the first lane L1 to the second lane L2 based on, for example, the detection result of the external sensor 3, and resets the target trace to the second trace TL2 at that timing. As such, in response to the change in the lateral position of the vehicle 2 due to the driver's steering intervention which exceeds the control torque and the entrance of the vehicle 2 into the adjacent lane, which is adjacent to the lane in which the vehicle 2 is traveling, the trace setting unit 10 resets the target trace to the adjacent lane.

Since the target trace is switched from the first trace TL1 to the second trace TL2 at the timing at which the vehicle 2 enters the second lane L2 from the first lane L1 (time t3), as illustrated in FIG. 2D, the deviation between the target trace and the lateral position of the vehicle 2 is suddenly changed. The steering angle determination unit 12 plots the deviation between the target trace and the lateral position of the vehicle 2, and determines that the deviation is discontinuously changed when the absolute value of the deviation change is equal to or higher than a predetermined value. FIG. 2F is a time chart in which a change in the lateral position deviation equal to or higher than the threshold value is detected as a discontinuous change. As illustrated in FIG. 2F, a discontinuous change in the deviation between the target trace and the lateral position of the vehicle 2 is detected at the timing at which the vehicle 2 enters the second lane L2 from the first lane L1 (time t3).

As described above, the steering angle determination unit 12 sets the target steering angle to cancel the lateral position deviation illustrated in FIG. 2D. For this reason, at time t3, when the sign of deviations between the target trace and the lateral position of the vehicle 2 are reversed between positive and negative, as illustrated in FIG. 2H, at time t3, a target steering angle $\theta_{lat}$ is set as the target steering angle. Then, the target steering angle represented by a broken line in FIG. 2H is set. In this case, the control torque is applied in the opposite direction, and thus, as represented by a broken line in FIG. 2C, the sign of the steering torque is also suddenly reversed between positive and negative, the driver's steering is greatly influenced.

For this reason, when the discontinuous change in the deviation between the target trace illustrated in FIG. 2F and the lateral position of the vehicle 2 is detected, the steering angle determination unit 12 stores a target steering angle $\theta_{hold}$ at that timing. In other words, the steering angle determination unit 12 stores the target steering angle $\theta_{hold}$ at the time of resetting the target trace. Then, by changing the stored target steering angle $\theta_{hold}$ using a gradual changing function, the steering angle determination unit 12 determines the target steering angle $\theta_{tgt}$ after the vehicle 2 enters the second lane L2. The gradual changing function is a function that restricts a sudden change and gradually changes the value, and examples thereof include an exponential function. Alternatively, the gradual changing function may be a rate limiter that operates based on a difference from a previous value. Further, the rate limiter may operate to increase a gradual changing amount at an initial stage of the start of the gradual changing and decrease the gradual changing amount after a predetermined time. Hereinafter, a case where an exponential function is used as a gradual changing function will be exemplified. The steering angle determination unit 12 determines the target steering angle $\theta_{tgt}$ after time t3 based on the following formula (1):

$$\theta_{tgt}=\theta_{lat}+(\theta_{hold}-\theta_{lat})\cdot e^{-at} \qquad (1)$$

As such, as illustrated in FIG. 2H, the target steering angle $\theta_{tgt}$ is smoothly and gradually changed. Then, as illustrated in FIG. 2C, a sudden change in steering torque is restricted. When the exponential function is used, the change in the target steering angle $\theta_{tgt}$ is increased immediately after the lane switching, and thereafter, the change in the target steering angle $\theta_{tgt}$ becomes slow. In other words, in a period from the timing at which the vehicle 2 enters the adjacent lane to a lapse of a predetermined time (a period immediately after the lane switching), the gradual changing amount per unit time is higher than a predetermined value, and after a lapse of the period immediately after the lane switching, the gradual changing amount per unit time is lower than the predetermined value. The predetermined value is a steering angle set in advance. By increasing the change in the target steering angle $\theta_{tgt}$ immediately after the lane switching, it is possible to limit returning to the original lane and also send a notification on the lane switching, as information, to the driver. Thereafter, by gently changing the target steering angle $\theta_{tgt}$, the vehicle behavior becomes gentle. FIG. 2G illustrates a period in which the target steering angle $\theta_{tgt}$ is determined using the above-described gradual changing function. The gradual changing period ends at a timing at which, for example, a difference between the target steering angle $\theta_{tgt}$ and the target angle (the target value) for following the lane before the gradual changing becomes equal to or lower than a predetermined value.

The track generation unit 14 generates a lane changing track from the lane in which the vehicle 2 is traveling to the adjacent lane. The track generation unit 14 generates a lane changing track based on the detection result of the external sensor 3. The lane changing control unit 15 controls the traveling of the vehicle 2 such that the vehicle 2 travels along the lane changing track generated by the track generation unit 14. The track generation unit 14 and the lane changing control unit 15 are elements that implement the automatic lane changing function. When the lateral position of the vehicle 2 is changed due to the driver's steering intervention, the lane changing control unit 15 controls the steering shaft of the vehicle 2 such that the deviation between the lateral position of the vehicle 2 and the lane changing track is decreased. In other words, the lane changing control unit 15 can cause the vehicle 2 to travel in cooperation with the driver under the lane changing control.

When the vehicle 2 enters the adjacent lane from the lane in which the vehicle 2 is traveling under the lane changing control with the driver's steering intervention, the situation is the same as that described in FIGS. 2A to 2H. In other words, gradual changing processing of the target steering angle $\theta_{tgt}$ is executed regardless of whether it is under the lane changing control.

Operation of Traveling Control Apparatus

Figure 3:
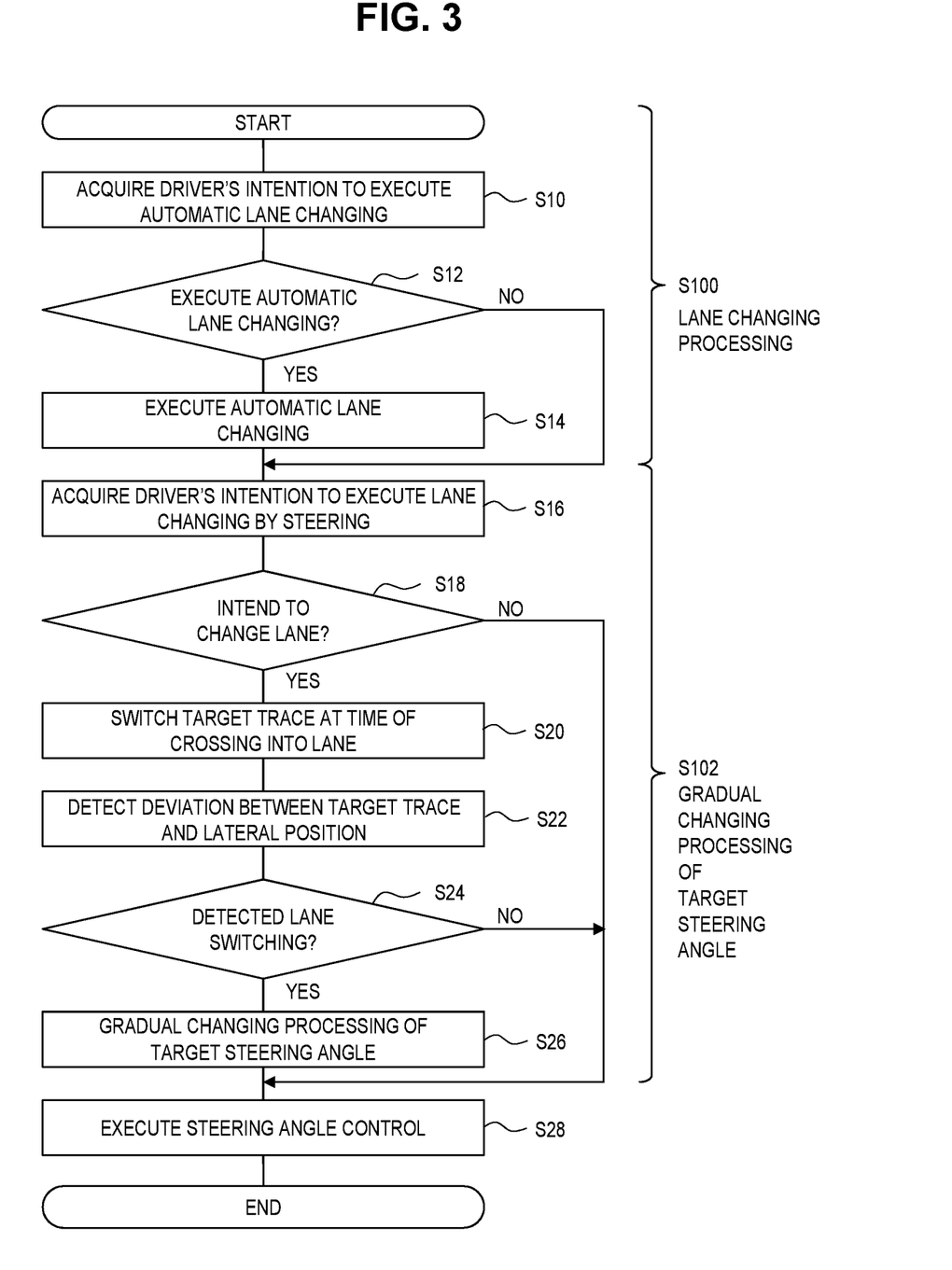
FIG. 3 is a flowchart illustrating an example of an operation of the traveling control apparatus according to the embodiment.

FIG. 3 is a flowchart illustrating an example of the operation of the traveling control apparatus according to the embodiment. The flowchart illustrated in FIG. 3 is executed by the traveling control apparatus 1 at, for example, the timing at which a start button of the lane maintenance function provided in the vehicle 2 is turned on.

As illustrated in FIG. 3, in step S10, the traveling control apparatus 1 acquires the driver's intention to execute the automatic lane changing. The traveling control apparatus 1 accepts an ON operation of the turn signal indicator or an approval operation in the HMI 6 for an automatic lane changing proposal made via, for example, the HMI 6.

Subsequently, in step S12, the traveling control apparatus 1 determines whether to execute the automatic lane changing. For example, when there is an ON operation of the turn signal indicator or an approval operation in the HMI 6 for the automatic lane changing proposal, the traveling control apparatus 1 determines that the automatic lane changing will be executed (step S12: YES), and executes the automatic lane changing (step S14). When the driver does not approve the automatic lane changing proposal, the traveling control apparatus 1 does not execute the automatic lane changing (step S12: NO).

Subsequently, in step S16, the traveling control apparatus 1 acquires the driver's intention to change the lane by steering. The traveling control apparatus 1 acquires a steering state of the driver. Then, when the driver is steering to approach the adjacent lane, the traveling control apparatus 1 determines that the driver intends to change the lane by steering (step S18: YES). On the other hand, when the driver is not steering to approach the adjacent lane, the traveling control apparatus 1 determines that the driver does not intend to change the lane by steering (step S18: NO).

Upon determining that the driver intends to change the lane by steering (step S18: YES), in step S20, the traveling control apparatus 1 executes switching processing. When it is a timing of crossing into the lane, the traveling control apparatus 1 switches the target trace. When it is not a timing of crossing into the lane, the traveling control apparatus 1 does not switch the target trace (see FIG. 2E). Subsequently, in step S22, the traveling control apparatus 1 detects the deviation between the target trace and the lateral position of the vehicle 2 (see FIG. 2D).

Subsequently, in step S24, the traveling control apparatus 1 determines whether it has detected the lane switching. When the deviation between the target trace acquired in step S22 and the lateral position of the vehicle 2 is lower than a predetermined value, the traveling control apparatus 1 determines that it has not detected the lane switching (step S24: NO). On the other hand, when the deviation between the target trace acquired in step S22 and the lateral position of the vehicle 2 is equal to or higher than the predetermined value, the traveling control apparatus 1 determines that it has detected the lane switching (step S24: YES, see FIG. 2F).

Upon determining that it has detected the lane switching (step S24: YES), in step S26, the traveling control apparatus 1 executes the gradual changing processing of the target steering angle. The traveling control apparatus 1 determines the target steering angle such that it is gradually changed using, for example, the above-described formula (1) (see FIG. 2H).

When step S26 ends, in step S28, the traveling control apparatus 1 controls the steering angle based on the target steering angle $\theta_{tgt}$ that has been gradually changed. As such, it is possible to prevent an occurrence of a sense of discomfort caused by the change in the steering torque at the timing of crossing into the lane.

On the other hand, upon determining that the driver does not intend to change the lane by steering (step S18: NO), in step S28, the traveling control apparatus 1 controls the steering angle based on the target steering angle $\theta_{tgt}$ that has not been gradually changed. In other words, when the automatic lane changing is being executed (step S14), the automatic lane changing is continued by the system based on the target steering angle $\theta_{tgt}$ that has not been gradually changed, and when the automatic lane changing is not being executed, the lane maintenance control is executed based on the target steering angle $\theta_{tgt}$ that has not been gradually changed.

On the other hand, upon determining that it has not detected the lane switching (step S24: NO), in step S28, the traveling control apparatus 1 controls the steering angle based on the target steering angle $\theta_{tgt}$ that has not been gradually changed. In other words, since the vehicle 2 is not crossing the boundary line VL between the first lane L1 and the second lane L2 even when the driver is steering the steering wheel, the lane maintenance control is executed based on the target steering angle $\theta_{tgt}$ that has not been gradually changed.

When the steering angle control ends, the flowchart illustrated in FIG. 3 ends. When the flowchart ends, the processes from step S10 are executed again until an end condition is satisfied. The end condition may be, for example, when an end button of the lane maintenance control is turned on. By executing the flowchart illustrated in FIG. 3, it is possible to restrict the change in the target steering angle that occurs when crossing into the lane in a case where the steering angle is manually adjusted before crossing into the lane during the automatic lane changing or in a case where the steering angle is manually adjusted without selecting automatic lane changing and the lane changing is executed.

Other Operations of Traveling Control Apparatus

Next, the operation of the traveling control apparatus 1 in a driving scene in which the driver takes his/her hand off the steering wheel during the lane changing by the driver's steering and then the vehicle 2 crosses into the lane by the automatic lane changing function or inertia will be described.

Figure 4A:
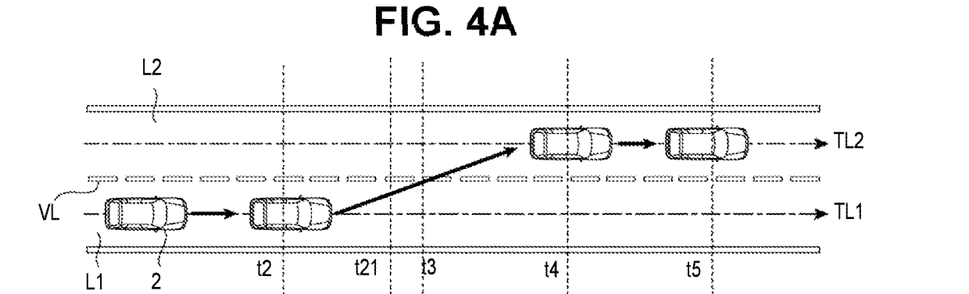
FIG. 4A is a diagram illustrating another example of the scene of the lane changing.
Figure 4B:
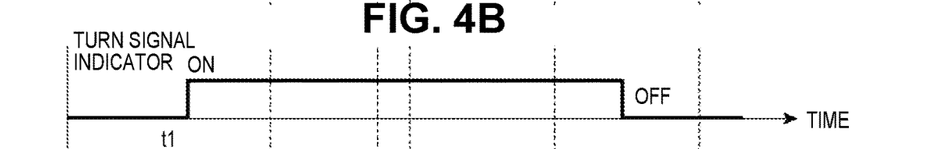
FIG. 4B is a time chart of the state of the turn signal indicator.
Figure 4C:
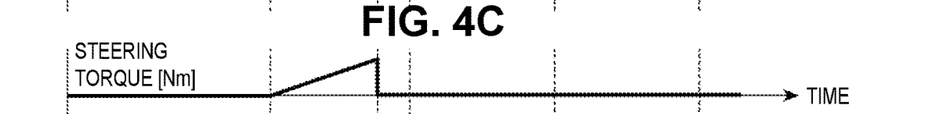
FIG. 4C is a time chart of the steering torque.

FIG. 4A is a diagram illustrating an example of a scene of lane changing, and is the same as FIG. 2A. FIG. 4B is a time chart of the state of the turn signal indicator. FIG. 4C is a time chart of the steering torque. The difference between FIGS. 2A to 2C and FIGS. 4A to 4C is that the driver takes his/her hand off the steering wheel at time t21 before the vehicle 2 crosses into the lane. As such, as illustrated in FIG. 4C, the steering torque becomes substantially zero at the timing of time t21.

Figure 4D:
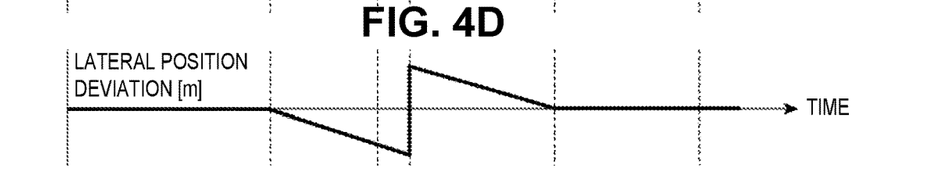
FIG. 4D is a time chart of the lateral position deviation.
Figure 4E:
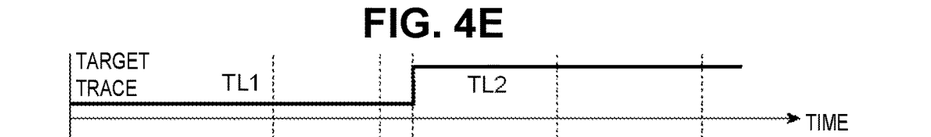
FIG. 4E is a time chart for setting the target trace.
Figure 4F:
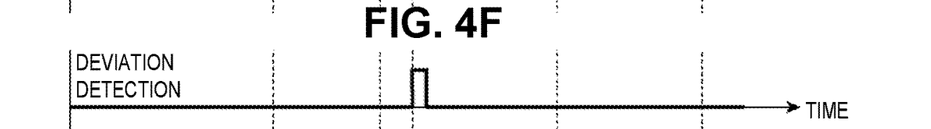
FIG. 4F is a time chart in which the discontinuity of the deviation between the target trace and the lateral position of the vehicle is detected.
Figure 4G:
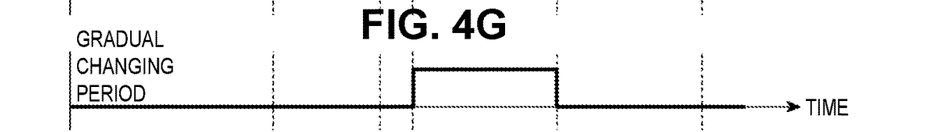
FIG. 4G is a time chart illustrating the gradual changing period of the target steering angle.
Figure 4H:
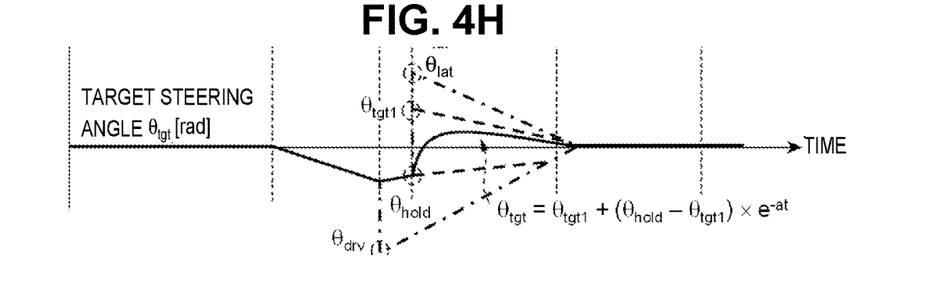
FIG. 4H is a time chart of the target steering angle.

FIG. 4D is the time chart of the lateral position deviation, FIG. 4E is the time chart for setting the target trace, FIG. 4F is the time chart in which discontinuity of a deviation between the target trace and a lateral position of a vehicle is detected, FIG. 4G is the time chart illustrating the gradual changing period of the target steering angle, and FIG. 4H is the time chart of the target steering angle. As described above, when driving is executed in cooperation with the driver, the size of the target steering angle is conservatively set assuming that the driver takes his/her hand off the steering wheel. For example, as illustrated in FIG. 4H, the target steering angle determined based on the deviation between the target trace and the lateral position of the vehicle 2 from the timing of grasping the steering wheel (time t2) to the timing of taking the hand off the steering wheel (time t21) is multiplied by a predetermined coefficient to set the target steering angle $\theta_{tgt}$ to be small. Then, the steering angle determination unit 12 determines the target steering angle at time t21, which is the end of the driver's steering, such that it approaches the target angle for gradually following the lane before the gradual changing with a lapse of time from the end of the driver's steering. As such, as illustrated in FIG. 4H, it is possible to prevent the target steering angle from being switched, at the timing of time t21, to a target steering angle $\theta_{drv}$ determined based on the deviation between the target trace and the lateral position of the vehicle 2. Then, from time t21, the target steering angle $\theta_{tgt}$ is smoothly converged. As illustrated in FIGS. 4D to 4F, in the same manner as in FIGS. 2D to 2F, at time t3, the vehicle 2 enters the second lane L2 from the first lane L1 and the target trace is switched from the first trace TL1 to the second trace TL2.

Here, at time t3, when the target steering angle $\theta_{tgt}$ is determined based on the deviation between the target trace and the lateral position of the vehicle 2, in the same manner as in FIG. 2H, the target steering angle becomes θw. Since $\theta_{hold}$ is set to be small from the timing at which the driver takes his/her hand off the steering wheel, when $\theta_{lat}$ is applied to the formula (1) as it is, an overshooting amount is increased and the vehicle behavior may not be gentle. For this reason, $\theta_{tgt1}$ obtained by correcting $\theta_{lat}$ to be smaller by multiplying it by a correction coefficient C (for example, 0.1 to 0.5) may be used. Alternatively, when a gradual changing progress rate is a and a target ratio during the steering is b, $\theta_{tgt1}$ may be calculated by the following formula (2):

$$\theta_{tgt1} = \theta_{lat} \times C \times (1-(1-a)\cdot(1-b)) \qquad (2)$$

Using the above-described $\theta_{tgt1}$, the target steering angle during the gradual changing period is expressed by the following formula (3):

$$\theta_{tgt} = \theta_{tgt1} + (\theta_{hold} - \theta_{tgt1}) \cdot e^{-at} \qquad (3)$$

As such, as illustrated in FIG. 4H, the target steering angle $\theta_{tgt}$ is smoothly and gradually changed. The gradual changing progress rate is used when the target steering angle is gradually changed to a target steering angle at a time of the driver's operation. The gradual changing progress rate is a value indicating how much the gradual changing is currently progressing when a gradual changing start is 0 and a gradual changing completion is 1. The target ratio during the steering is a value obtained by dividing a target angle gain at the time of the driver's operation by a target angle gain at a time of a normal operation (when the overshooting is not restricted), and is a value indicating a ratio of the gain at the time of the driver's operation to the gain at the time of the normal operation.

Figure 5:
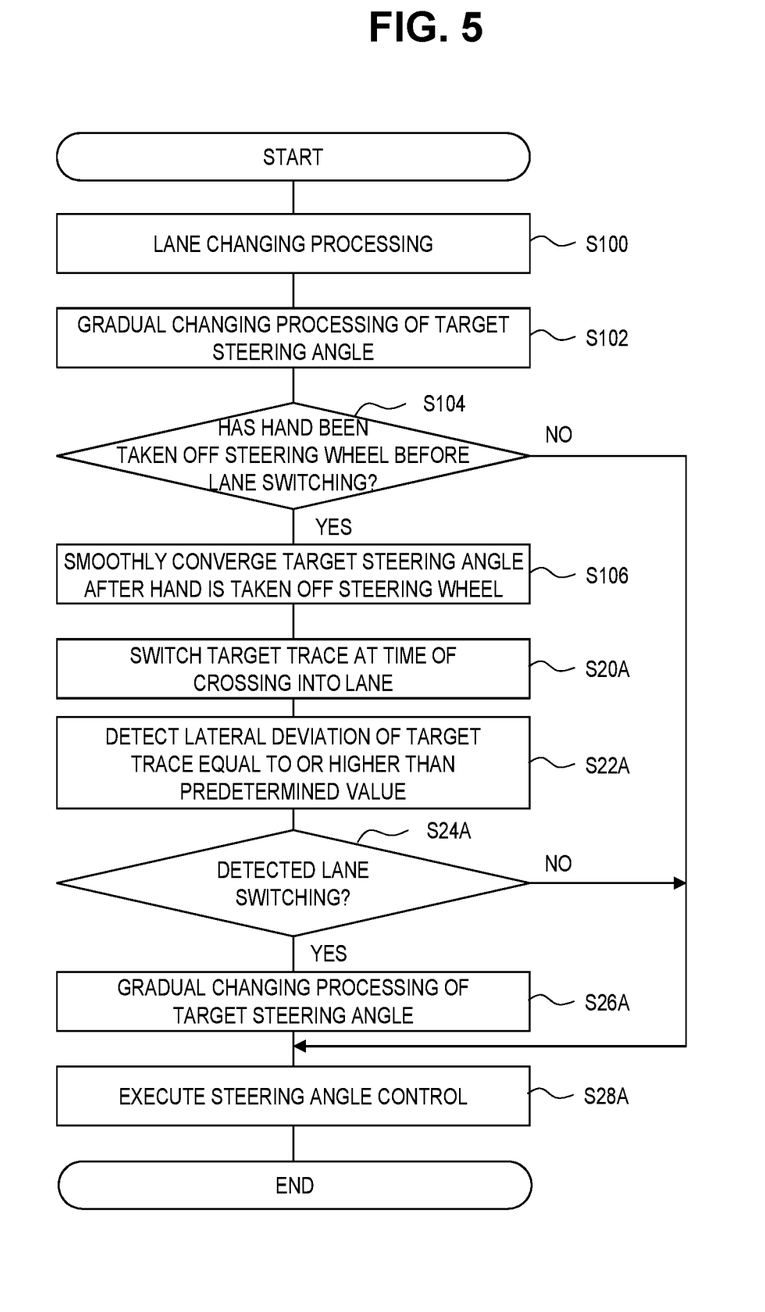
FIG. 5 is a flowchart illustrating an example of the operation of the traveling control apparatus according to the embodiment.

The operation of the traveling control apparatus 1 according to the time chart illustrated in FIG. 4 is illustrated in FIG. 5. FIG. 5 is a flowchart illustrating an example of the operation of the traveling control apparatus 1 according to the embodiment. The flowchart illustrated in FIG. 5 is executed by the traveling control apparatus 1 at, for example, the timing at which a start button of the lane maintenance function provided in the vehicle 2 is turned on.

As illustrated in FIG. 5, in step S100, the traveling control apparatus 1 executes lane changing processing. The lane changing processing is the same as that of steps S10 to S14 of FIG. 3.

Subsequently, in step S102, the traveling control apparatus 1 executes the gradual changing processing of the target steering angle. The lane changing processing of the target steering angle is the same as that of steps S16 to S26 of FIG. 3.

Subsequently, in step S104, the traveling control apparatus 1 determines whether the driver has taken his/her hand off the steering wheel before the lane switching. The traveling control apparatus 1 determines whether the driver has taken his/her hand off the steering wheel before the lane switching based on, for example, the magnitude of the steering torque.

Upon determining that the driver has taken his/her hand off the steering wheel before the lane switching (step S104: YES), the traveling control apparatus 1 changes the target steering angle after the hand is taken off the steering wheel such that it is smoothly converged to the target angle for following the lane before the gradual changing. The processing of subsequent steps S20A to S28A is the same as that of steps S20 to S28 of FIG. 3. When the flowchart illustrated in FIG. 5 ends, the processes from step S100 are executed again until the end condition is satisfied. The end condition may be, for example, when an end button of the lane maintenance control is turned on. By executing the flowchart illustrated in FIG. 5, in a case where the steering angle is manually adjusted before crossing into the lane during the automatic lane changing and the driver has taken his/her hand off the steering wheel, or in a case where the steering angle is manually adjusted without selecting the automatic lane changing and the lane changing is executed while the hand is taken off the steering wheel, it is possible to restrict the change in the target steering angle that occurs when crossing into the lane.

Summary of Embodiments

In response to the change in the lateral position of the vehicle 2 due to the driver's steering intervention which exceeds the control torque and the entrance of the vehicle 2 into the second lane L2, which is adjacent to the first lane L1, the traveling control apparatus 1 resets the target trace to the second lane L2. Then, in response to the resetting of the target trace to the second lane L2, the target steering angle $θ_{tgt}$ after the vehicle 2 enters the second lane L2 is determined by changing the target steering angle $θ_{tgt}$ at the time of resetting the target trace using the gradual changing function. As such, when the target trace is switched, the traveling control apparatus 1 does not determine the target steering angle based on the target trace and the lateral position of the vehicle 2, but can determine the target steering angle $θ_{tgt}$ in the second lane L2 such that it is gradually changed from the target steering angle $θ_{tgt}$ at the time of resetting the target trace. Therefore, the traveling control apparatus 1 can restrict the change in the target steering angle when the lane changing is executed by the driver's manual intervention while continuing the lane maintenance control, as compared with when the target steering angle is determined based on the target trace and the lateral position of the vehicle 2.

The traveling control apparatus 1 can prevent the target steering angle from being suddenly changed when the driver takes his/her hand off the steering wheel before the vehicle 2 enters the second lane L2. Then, when the vehicle 2 enters the second lane L2 while the target steering angle is being smoothly converged after the hand is taken off the steering wheel, the target steering angle in the adjacent lane is determined to be gradually changed from the target steering angle $θ_{hold}$ at the time of resetting the target trace. Therefore, the traveling control apparatus 1 can restrict the change in the target steering angle even when the driver takes his/her hand off the steering wheel before the vehicle 2 enters the second lane L2.

When the vehicle 2 enters the adjacent lane due to the driver's steering intervention during the lane changing by the automatic lane changing function, the traveling control apparatus 1 determines the target steering angle in the second lane L2 such that it is gradually changed from the target trace at the time of resetting the target trace. Therefore, the traveling control apparatus 1 can restrict the change in the target steering angle even when the vehicle 2 enters the second lane L2 due to the driver's steering intervention during the lane changing by the automatic lane changing function.

Modified Example

As above, various exemplary embodiments have been described, but the present disclosure is not limited to the above-described exemplary embodiments and various omissions, substitutions, and changes may be made.

In the above embodiment, as expressed in the formula (1), the difference between the target steering angle $θ_{hold}$ before the discontinuity and the target steering angle $θ_{lat}$ after the discontinuity influences the target steering angle $θ_{tgt}$. When a processing filter, such as a low-pass filter, is applied to the target steering angle, the difference may not be accurately calculated. Further, responsiveness may decrease when the low-pass filter is applied. For this reason, when the formula (1) is applied, it is possible to obtain a smooth target steering angle $θ_{tgt}$ by removing the low-pass filter applied to the target steering angle and determining the target steering angle. Such filter unlocking is temporarily executed in response to the resetting of the target trace to the adjacent lane.

What is claimed is:

1. A traveling control apparatus that allows lane changing due to a driver's steering intervention while continuing lane maintenance control that controls traveling of a vehicle such that the vehicle travels in a lane, the traveling control apparatus comprising an electronic control unit configured to:
   set a target trace along a lane in which the vehicle is traveling;
   acquire a lateral position of the vehicle;
   determine a target steering angle of the vehicle based on the set target trace and the acquired lateral position of the vehicle;
   apply control torque to a steering shaft of the vehicle based on the target steering angle determined by the electronic control unit;
   reset, in response to a change in the lateral position of the vehicle due to the driver's steering intervention which exceeds the control torque and entrance of the vehicle into an adjacent lane, the target trace to the adjacent lane, the adjacent lane being adjacent to the lane; and
   determine, using a gradual changing function, in response to the resetting of the target trace to the adjacent lane, the target steering angle after the vehicle enters the adjacent lane by changing the target steering angle at a time of resetting the target trace;
   wherein, in the gradual changing function, a gradual changing amount per unit time is higher than a predetermined value during a period from a timing at which the vehicle enters the adjacent lane to a lapse of a predetermined time, and lower than the predetermined value after a lapse of the period.

2. The traveling control apparatus according to claim 1, wherein the electronic control unit is configured:
   to apply a processing filter to the target steering angle when the target trace is set to the lane and the adjacent lane; and
   not to apply the processing filter to the target steering angle when the target trace is reset to the adjacent lane.

3. The traveling control apparatus according to claim 1, wherein the electronic control unit is configured to, in response to returning to the lane during a gradual changing after the vehicle enters the adjacent lane, execute a processing from the target steering angle during the gradual changing that resets the target trace to the lane.

4. The traveling control apparatus according to claim 1, wherein the electronic control unit is configured to, when the driver ends the steering intervention before the vehicle enters the adjacent lane, determine the target steering angle such that the target steering angle at an end of the driver's steering approaches a target angle for following the lane before the gradual changing with a lapse of time from the end of the driver's steering.

5. The traveling control apparatus according to claim 1, wherein the electronic control unit is configured to:
   generate a lane changing track from the lane to the adjacent lane,
   control the traveling of the vehicle such that the vehicle travels along the generated lane changing track; and
   reset, in response to the change in the lateral position of the vehicle due to the driver's steering intervention during the lane changing and the entrance of the vehicle into the adjacent lane, the target trace to the adjacent lane, the adjacent lane being adjacent to the lane.

* * * * *